United States Patent [19]

Cooper

[11] 3,786,269

[45] Jan. 15, 1974

[54] METHOD AND APPARATUS OF SCANNING ELECTROMAGNETIC RADIATION USING ROTATING DETECTORS-EMITTERS AND CONTROL CIRCUIT

[75] Inventor: Erwin E. Cooper, Dallas, Tex.

[73] Assignee: Texas Instruments Incorporated, Dallas, Tex.

[22] Filed: Dec. 17, 1971

[21] Appl. No.: 209,329

[52] U.S. Cl. .............................. 250/334, 250/332
[51] Int. Cl. .............................. G01j 1/00
[58] Field of Search ............... 250/83.3 H, 83.3 HP, 250/332, 334

[56] References Cited

UNITED STATES PATENTS

| | | | |
|---|---|---|---|
| 3,220,010 | 11/1965 | Hand, Jr. | 250/83.3 H X |
| 3,610,930 | 10/1971 | Lacy et al. | 250/83.3 H X |
| 3,180,989 | 4/1965 | Hand, Jr. et al. | 250/83.3 H |
| 3,596,096 | 7/1971 | Koehler | 250/83.3 H |

*Primary Examiner*—Archie R. Borchelt

[57] ABSTRACT

An infrared scanning system which does not require the use of scanning mirrors is disclosed. An array of infrared detectors is mounted on a support member. Infrared radiation is focused on the array of detectors by a lens system and the support member is rotated to scan the scene of interest. An array of emitters is mounted on the opposite end of the support member and the electronics necessary to interface the detector array with the emitter array is mounted on the outer surface of the support member. The central portion of the support member also includes a mechanical cryogenic refrigerator for cooling the detector array. In scanning, the complete structure including the detector array, the emitter array, the electronics interconnecting the emitter, the detector array and the refrigerator are rotated about a common axis by a drive motor. A television camera is focused on the emitter array to produce a TV image of the scene scanned by the array of infrared detectors.

12 Claims, 10 Drawing Figures

METHOD AND APPARATUS OF SCANNING ELECTROMAGNETIC RADIATION USING ROTATING DETECTORS-EMITTERS AND CONTROL CIRCUIT

SUMMARY OF THE INVENTION AND BACKGROUND INFORMATION

The invention relates to improved apparatus and methods for optical scanners and more particularly to improved apparatus and methods for optical scanning applicable to systems which in the preferred embodiment operate in the infrared region of the electromagnetic radiation spectrum.

Prior art infrared optical scanners were expensive to build and required extensive maintenance to assure that these systems operated with a reasonable degree of reliability. Many of these systems also failed to fully utilize the full capabilities of available infrared detectors. Many of these disadvantages were directly traceable to the necessity for using rotating mirrors in the optical portions of these systems in order to achieve scanning.

Typical prior art infrared scanning systems employed one or more rotating mirrors positioned between the lens system and the detector array in order to deflect the infrared radiation to cause the field of view of the detector to be shifted to scan the scene of interest. A similar mirror positioned between the emitter array and the projection lens deflected the output of the emitter array to create an image of the area scanned. These mirrors presented a multiplicity of problems.

An inherent problem in this arrangement was that the mirrors had to be positioned between the lens system and the detector and emitter arrays. The presence of these mirrors placed severe restraints on the design of the lens systems because there was always a considerable distance between the array and the first lens of the lens system associated therewith. Additional problems were presented by the fact that the rotating mirror used with the detector array also had to be aligned with respect to the rotating mirror used with the emitter array.

The rotating mirrors also caused the beam of infrared energy from the lens system to be deflected such that the beam did not impinge on the detector array for a significant portion of each rotation cycle of the mirrors. This had the effect of limiting the duty cycle of the detector array and reduced the overall sensitivity of the system.

The detector array of prior art systems was also typically mounted in a vacuum and cooled in order to achieve reasonable efficiencies. The vacuum was typically maintained by a mechanical vacuum pump which was connected to the chamber in which the detector array was mounted. The vacuum pump was operated continuously when the scanner was in operation. This method of maintaining a vacuum in the detector chamber performed adequately; however, the vacuum pump added considerably to the complexity of the system and also presented significant maintenance problems.

Accordingly, it is an object of the invention to provide an improved scanner system and method.

Another object of the invention is to provide an infrared scanner in which scanning is achieved by rotating the detector array, and the emitter and detector arrays are in synchronism due to the mounting thereof on a common rotating support.

Another object of this invention is to provide an infrared scanner system utilizing simplified scanning methods.

Another object of the invention is to provide an infrared scanner system in which he detector array has a high duty cycle.

Another object of the invention is to provide an infrared scanner system in which the vacuum is maintained in the chamber in which the detector array is positioned without the use of mechanical vacuum pumps.

Another object of the invention is to provide an infrared scanner system in which the lens system can be placed at any convenient distance with respect to the detector and emitter arrays.

Another object of the invention is to provide an infrared scanner having a lower noise equivalent temperature (NET) figure.

Another object of the invention is to provide an improved scanning method applicable to infrared scanners and other similar systems.

Another object of the invention is to provide an improved dewar in which a vacuum is maintained without the use of mechanical pumps.

One embodiment of the invention provides an infrared scanner system in which the detector array is mounted on one end of a rotating support member and the emitter array is mounted on the other end of the same member. All the electronic circuitry necessary to interconnect the detector array with the emitter array is mounted around the outer surface of the rotating support member. The support member also includes a system for cooling the detector array and a cold shield for protecting the detector array from unwanted infrared radiation. The support member is supported at each end by bearings and rotated about its longitudinal axis by a drive motor. Rotating the support member causes both the emitter and detector arrays and all the electronics associated therewith to be rotated.

A lens system focuses infrared radiation from the scene of interest onto the detector array. The detectors comprising the array are mounted in a substantially straight line centered about the axis of rotation. Rotating the support member and the detector array attached thereto causes the detector array to scan the area within the field of view of the lens system.

A TV camera is focused on the emitter array. As the support member and the emitter array attached thereto are rotated, theoutput of the emitters reproduce the scene scanned by the detector array. The emitter array has a number of elements equal to the number of elements in the detector array and the elements of the emitter and detector arrays are similarly positioned. That is, if the detectors are positioned in a straight line centered about the axis of rotation, the emitters will also be positioned in a straight line centered about the axis of rotation. The electronic circuitry couples the output of each element of the detector array to a correspondingly positioned element of the emitter array. The circuitry is adjusted such that the output of each of the emitters has a predetermined relationship to the amount of infrared radiation impinging upon the detector with which it is associated. The output of the TV camera is a conventional display with the intensity of each portion of the display having a predetermined relationship to the infrared radiation emitted from the corresponding portion of the scene scanned by the detector array.

A temperature reference source is also included in the system. The temperature of the reference source is controlled so that it is maintained to correspond to the average temperature of the scene being scanned. Periodically the field of view of the detector is switched from the scene being scanned to the temperature reference source. The average output of the detector array during the time when the detector is looking at the reference source is compared to the average output of the detector array when the scene is being scanned to generate signals which adjust the temperature reference source to correspond to the average temperature of the scene being viewed.

The output signals from the detector array during the time when the temperature reference source is being viewed is used as a reference signal for restoring the DC level of the signals driving the emitter array.

The detector array is mounted in a chamber which includes a getter to maintain a vacuum within this chamber. This feature entirely eliminates the need for the mechanical vacuum pump associated with prior art systems. The elimination of the rotating scanning mirrors of prior art systems permits the lens system associated with both the detectors and the emitters to be placed any convenient distance from these arrays. The elimination of the scanning mirrors also increases the duty cycle of the detector array because it eliminates the time periods when the scanning mirrors were positioned such that no radiation from the scene being scanned was arriving at the detectors. THese features associated with the new apparatus and methods of optically scanning substantially improves the overall performance of the system. The sensitivity of the scanner can be easily increased by 20 percent using these techniques while the maintenance problems are reduced by the elimination of complex mechanical parts such as rotating mirrors.

The above discussed objects, other objects and the general description of specific embodiments will be better understood in view of the following detailed description and the attached drawings.

DETAILED DESCRIPTION

Figure 1:
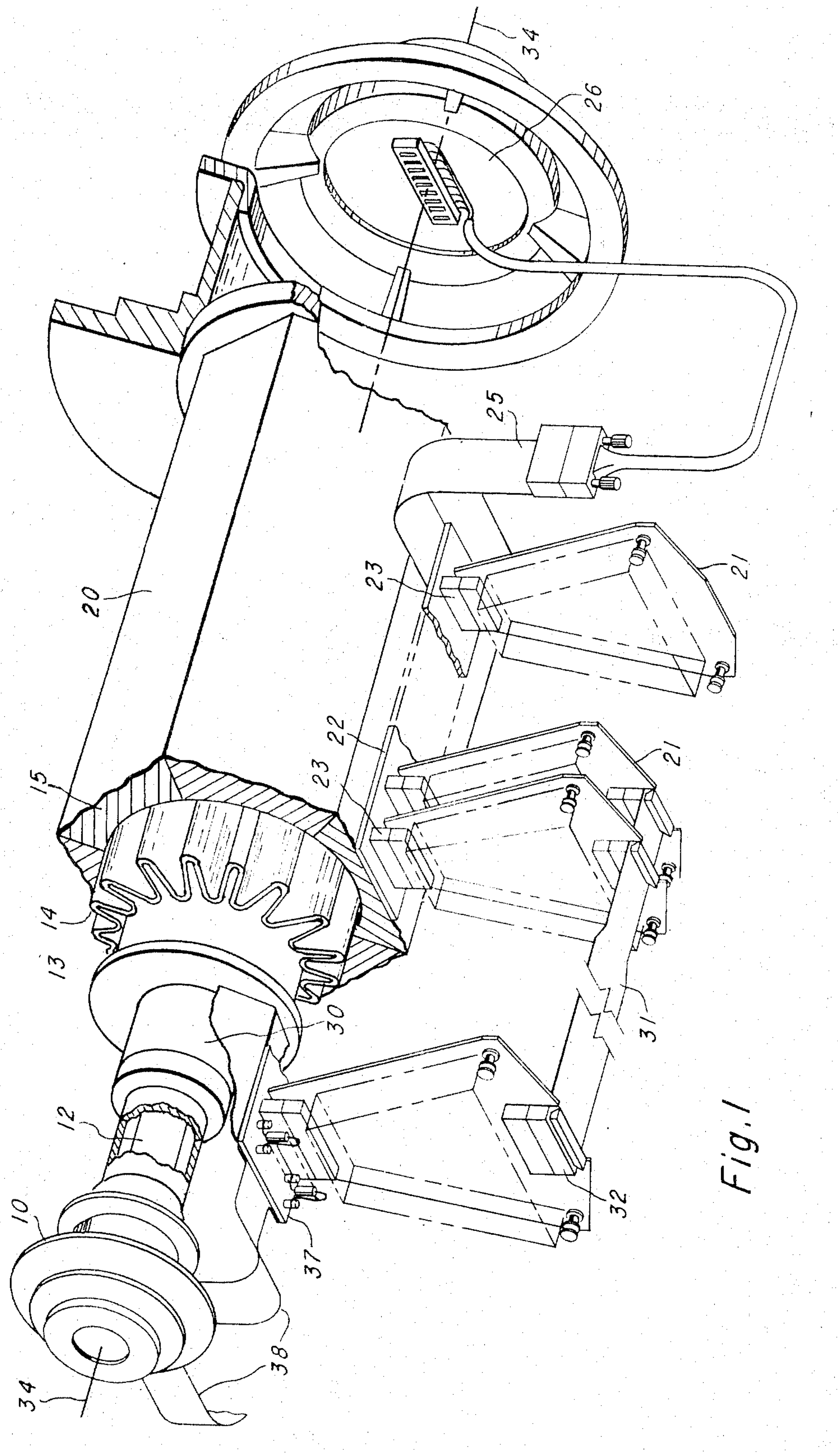
FIG. 1 is a pictorial drawing of the rotating portion of the scanner system.
Figure 4:
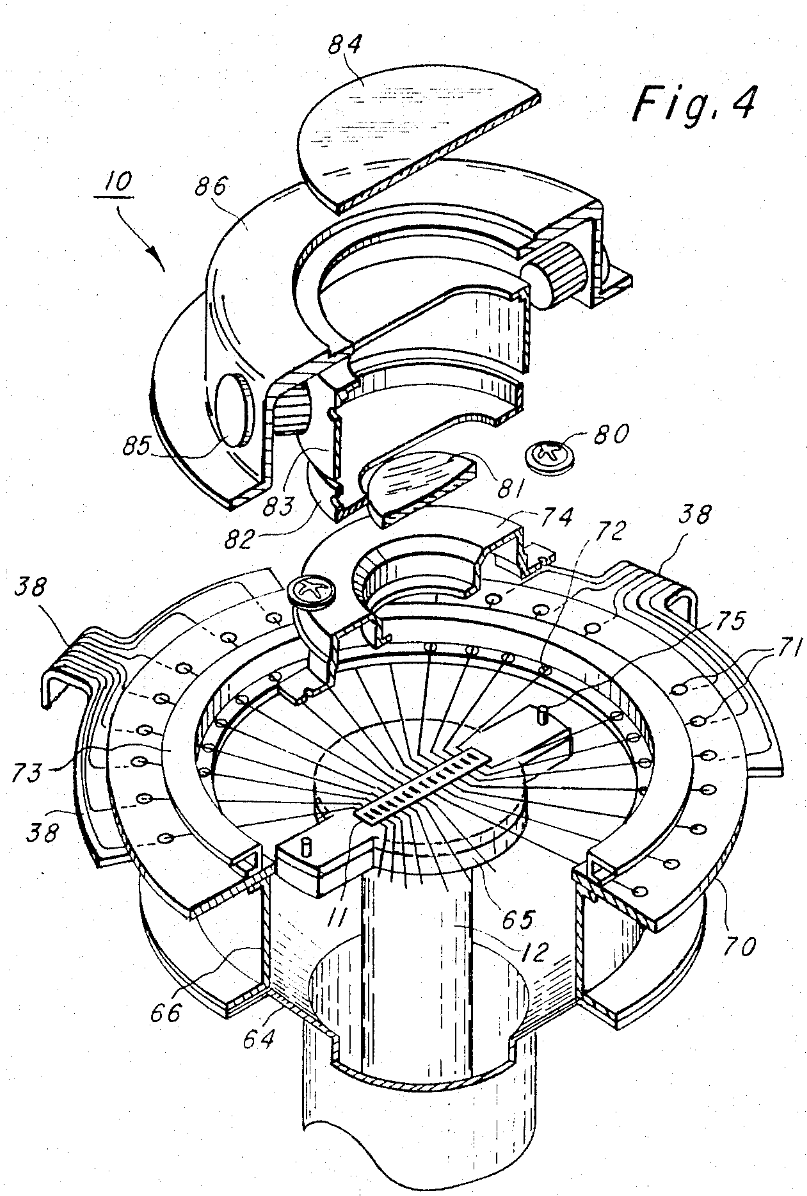
FIG. 4 is an exploded view of the dewar in which the detector array is mounted.

Referring now to FIG. 1, there is shown in pictorial form the basic rotating components of the scanner system which in the preferred embodiment operates in the infrared region. Included therein is a dewar 10 in which an array of infrared detectors 11 is mounted. (The array of detectors is not visible in FIG. 1, but is illustrated in FIG. 4 and will be described in detail later). The array of detectors 11 is mounted on a coldfinger 12. The coldfinger is maintained at approximately 50°K by a Sterling cycle refrigerator 13. Positioned around the Sterling cycle refrigerator 13 is a heat exchanger 14. In the completed system, air is circulated through the heat exchanger 14 to remove heat from the Sterling cycle refrigerator 13. Around the outer perimeter of the heat exchanger 14 is positioned mounting member 15. The inner surface of the mounting member 15 is a circle and the outer surfaces 20 are flat for mounting the circuit boards 21. To balance the rotating components circuit boards are mounted on each of the flat surfaces 20 and around the neck portion 30 of the dewar 10. Only one row of circuit boards 21 are shown for simplicity of illustration.

A motherboard 22 is mounted along each of the flat surfaces 20 and a plurality of connectors 23 are attached thereto. The second half of connector 23 is attached to circuit boards 21 enabling these boards to be plugged into the motherboard 22. A connector 32 may also be mounted on the top portion of each of the circuit boards 21. Only selected circuit boards will include this connector. The use of this connector 32 will be subsequently explained. Attached to one end of the motherboard 22 is an output cable 25 which is coupled to an array of light emitting diodes 26. The array of light emitting diodes 26 includes a diode corresponding to each element of the array of infrared detectors 11. The details of the light emitting diode array 26 will also be discussed later.

The motherboards 37 positioned along the neck portion of the dewar 10 are interconnected to the array of infrared detecors 11 by a cable 38. A separate cable 38 is included for each row of circuit boards. The circuit boards 21 mounted along the neck portion 30 of the dewar 10 are interconnected with the circuit boards mounted around the heat exchanger 14 by a cable 31. Cable 31 is connected to the top portion of the circuit boards 21 using a connector 32 attached to the top portion of selected ones of circuit boards 21. The detailed function of the circuit boards 21 will be described later. Other similar circuit boards and the power supplies to operate the electronics are distributed around the other flat surfaces 20 of the mounting member 15 so as to dynamically balance the rotating structure along an axis passing through the center of the light emitting diodes of array 26 and the array of infrared detectors 11.

The circuit boards 21 must be provided with suitable restraining means (not shown) to prevent connectors 23 and 32 from separating as the structure is rotated about axis 34.

The array of detectors 11 is cooled by energizing the Sterling cycle refrigerator 13. A lens system (not shown) is positioned in front of the detector array 11 to focus infrared energy on the array and the structure is rotated about the horizontal axis 34 to cause the array of infrared detectors 11 to scan the scene of interest. The electronic circuitry mounted on circuit boards 21 is adjusted so that the output of each element of the array of light emitting diodes 26 has a predetermined relationship to the infrared radiation impinging upon its corresponding member in the detector array 11. This permits the scene of interest to be scanned by the process of rotation the entire structure about axis 34 as compared to the prior art systems in which scanning mirrors were required between the lens system and the detector array of as well as between the emitter array 26 and the screen or TV camera (not shown) on which the output of the emitter array was projected to reproduce the scene.

Figure 2:
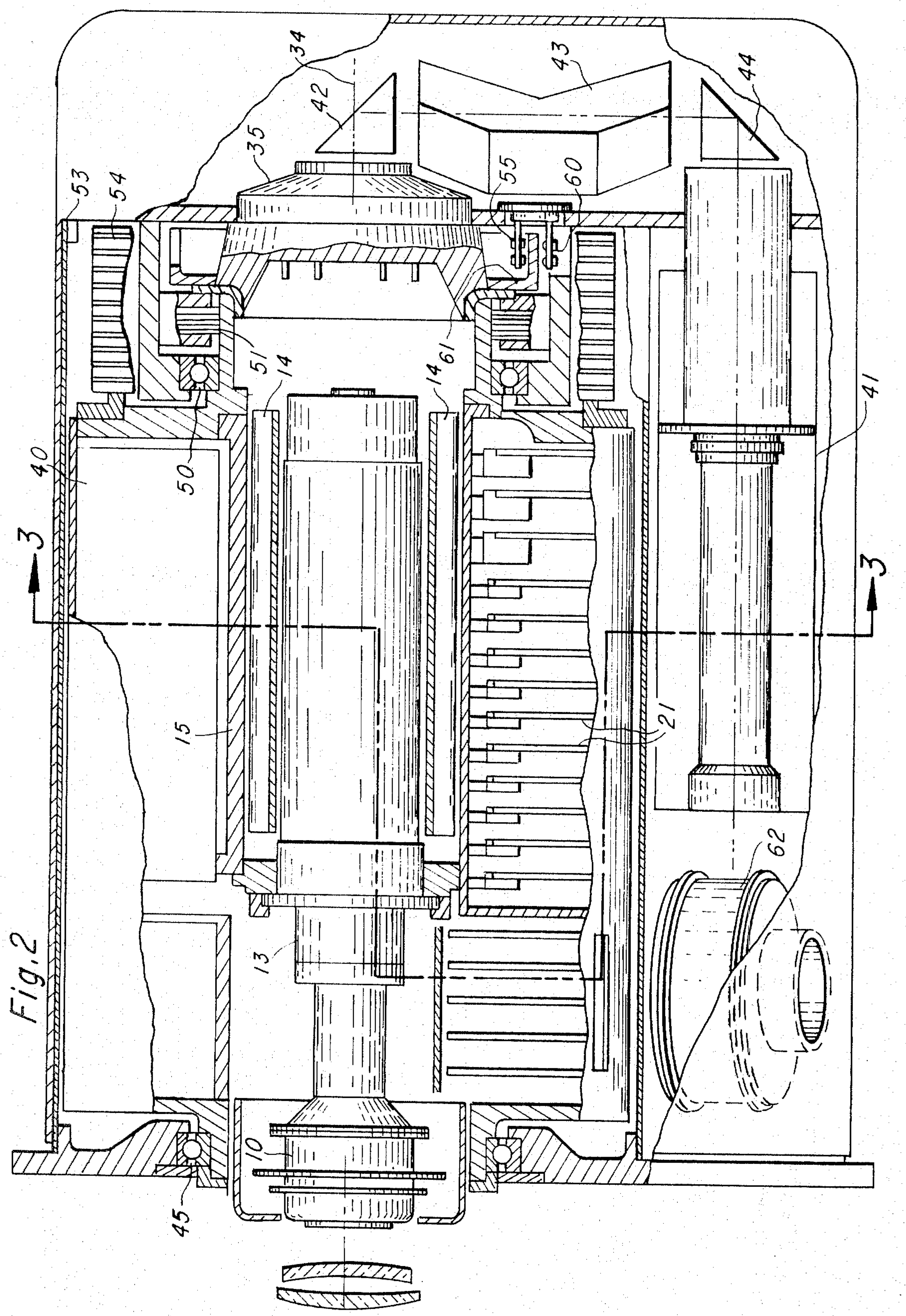
FIG. 2 is a cross section of the scanner along the axis of rotation.

Referring now to FIG. 2, which is a cross-section of the scanner taken along the axis of rotation 34, it can be seen that the dewar 10 is coupled to one end of the Sterling cycle refrigerator 13. The emitter head assembly 35 is coupled to the refrigerator 13 through mounting member 15. The circuit boards 21 are mounted around the refrigerator 13 and on mounting member 15. The edge view of typical circuit boards can be seen in this figure. One of the power supplies 40 is also shown symbolically in this view. This view is taken along section line 2—2 of FIG. 3.

A TV camera 41 is focused on the array of light emitting diodes 26 (not shown in this figure) through prisms 42, 43 and 44 to produce a TV image of the scene scanned by the array of infrared detectors 11. The TV camera 41 is mounted substantially parallel to the axis 34. The image is deflected 90° by a first prism 42, transmitted through a rotating prism 43 and then deflected another 90° by prism 44 causing the image to impinge upon the TV camera 41. Prism 43 is designed such that the image of the scene as seen by the TV camera can be rotated by rotating this prism. This provides a convenient means of aligning the TV image with the image as seen by the array of infrared detectors 11.

Figure 3:
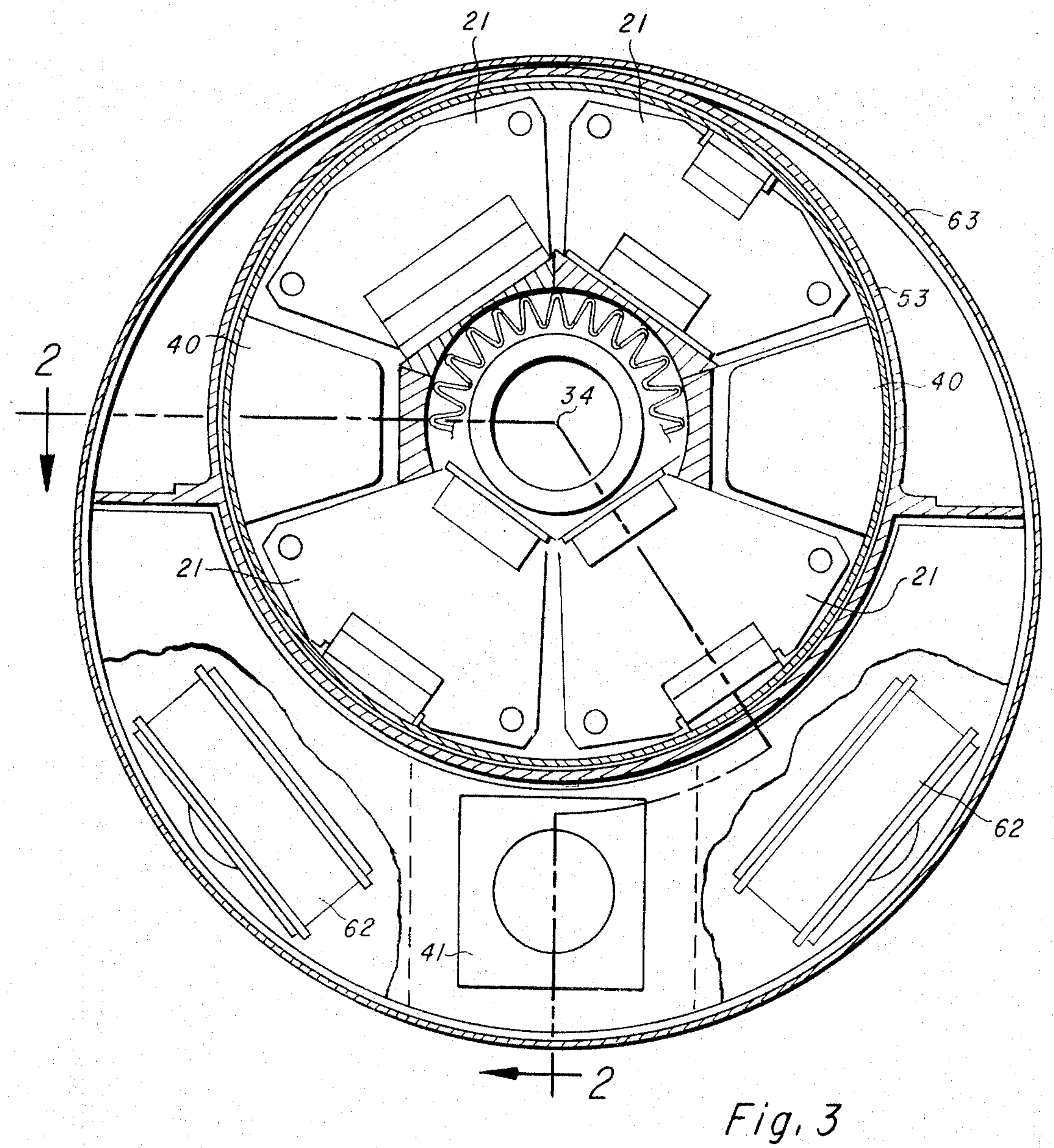
FIG. 3 is a cross section of the cross section along an axis transverse to the axis of rotation.

The rotary structure comprising the Sterling cycle refrigerator 13, the circuit boards 21, the detector dewar 10, the emitter head 35, and the power supplies 40 are mounted in two bearings 45 and 50. A specially designed electric motor is used to rotate this structure. The rotor 51 of the motor is mounted to the rotary structure and the stator 52 is secured to the housing 53 of the scanner. A series of slip rings 54 are used to couple electric power and control signals to the scanner. A light emitting diode 55 and a light detector 60 are mounted on opposite sides of a thin metal ring 61 which is secured to the rotating structure. Openings are selectively positioned in ring 61 so that the light detector 60 will periodically generate signals having a predetermined relationship to the rate at which the drive motor is rotating. The output pulses from the light detector 60 are used to generate sync pulses to synchronize the TV camera 41 with the rotation of the array of light emitting diodes 26. A fan 62 is also hown in this view. This fan circulates air through the heat exchanger 14 to remove heat from the Sterling cycle refrigerator 13 and around the outer edge of the rotary portion to cool the printed circuit boards 21 and the power supplies 40. FIG. 3 illustrates in cross-section the scanner along section line 3—3 of FIG. 2. This figure shows two power supplies 40 positioned on opposite sides of the axis of rotation. The two power supplies 40 are positioned on opposite sides of the axis of rotation in order to aid in dynamically balancing the rotating portion of the system. The postamplifiers and the preamplifiers, comprising circuit boards 21, are also similarly positioned on opposite sides of the axis of rotation. The function of the pre-and post-amplifiers will be described later.

Dynamic balancing is particularly important because in one embodiment of the invention the structure rotates at 1,800 RPM. If proper dynamic balancing is not achieved by symmetrically positioning similar circuit boards 21 and power supplies 40 with respect to the axis of rotation 34, balancing weights may be used. The rotating structure is mounted in circular housing 53 and this structure is positioned in an outer housing 63 in an off-centered relationship. This provides space between the circular housing 53 and the outer housing 63 for the fans 62 and the TV camera 41 to be mounted.

Referring now to FIG. 4, there is shown an exploded breakaway view of details of the detector dewar 10. The dewar includes a lower vacuum jacket 64. This jacket is somewhat funnel-shaped with a flat upper lip portion and a neck portion which extends and attaches to the Sterling cycle refrigerator 13. (FIG. 1) The vacuum jacket 64 could also be cylinderical in shape, the exact shape being a matter of convenience. A cold-finger 12 extends through the neck portion of the lower vacuum jacket 64 and the array of infrared detectors 11 is mounted thereon. A substrate 65 electrically insulates the array of infrared detectors 11 from the cold-finger 12. Positioned immediately above the lower vacuum jacket 64 is a lower sealing ring 66. The lower sealing ring 66 has lip portions at both the bottom and top edges. The lower lip portion is attached to the lip portion of the lower vacuum jacket 64 by brazing or other suitable means.

Positioned immediately above the lower sealing ring 66 is a feed-through substrate 70. This substrate is an electrical insulator, such as ceramic, and has a series of terminals 71 disposed around its outer perimeter. The number of terminals 71 disposed around the outer perimeter of the feed-through substrate 70 will be determined by the number of elements in the array of infrared detectors 11. A second series of terminals 72 are disposed along the inner perimeter of the feed-through substrate 70 with the terminals 72 and 71 being interconnected. The leads interconnecting the outer and inner terminals, 71 and 72, are covered with a thin layer of insulating material such as ceramic, and the upper sealing ring 73 may be bonded to the feed-through substrate 70 by forming a thin layer of gold, for example, on the feed-through substrate 70 and brazing the upper sealing ring 73 to the gold layer. The lower sealing ring 66 is similarly bonded to the other side of the feed-through subtrate 70.

A lens mounting ring 74 is secured to the cold-finger 12 by positioning the lens mounting ring 74 such that the small rod-like portions 75 on the cold-finger 12 extend through openings in the lens mounting ring 74 and securing this ring in position with push nuts 80. A lens 81 is then positioned in the lens mounting ring 74 and secured therein by any suitable means. Mounted on top of the lens mounting ring 74 is a coldshield 83 has an opening therein which is elongated to limit the field of view of the array of infrared detectors 11 to the desired angle. Immediately below the coldshield 83 and secured thereto is the coldshield baffle 82. The coldshield 83 and the coldshield baffle 82 are in good thermal contact with the coldfinger 12 and acts as a shield to prevent unwanted infrared radiation from inpinging upon the array of infrared detectors 11. The coldshield baffle 82 also has an elongated opening therein to limit the field of view of the array of infrared detectors 11 to the desired angle.

Positioned immediately above the upper sealing ring 73 is the upper vacuum jacket 86. The upper vacuum jacket has a circular opening therein in which a window 84 is positioned. The window 84 is formed of a material which has good transmitting characteristics in the infrared region of the electromagnetic radiation spectrum. The window 84 may be made from Itran-2 for example. Itran-2 is a pressed sintered zinc sulfide available from Eastman Kodak Company, Rochester, N. Y. The upper vacuum jacket 86 is attached to the upper sealing ring 73 by brazing or some other suitable technique.

Mounted around the outer perimeter of the upper vacuum jacket 86 is a series getter-type vacuum pumps 85. The function of these pumps is to absorb any molecules of gas which are inside the dewar to maintain a vacuum therein. A suitable vacuum pump is manufacutred and sold by SOCOETA APPARECCHI ELETTRICIE SCIENTIFICS.

It is necessary to maintain a vacuum in the dewar 10 in order to assure that the Sterling cycle refrigerator 13 will have the capability of maintaining the detector array 11 and the other parts of the dewar assembly at a sufficiently low temperature to assure that the detector array 11 operates at reasonable efficiency. The getter-type vacuum pumps 85 are a substantial improvement over the mechanical vacuum pumps formerly employed because they do not require complicated high vacuum lines to connect the dewar 10 to the vacuum pump. The prior art mechanical vacuum pumps also presented significant maintenance problems. Prior art vacuum system are also not practical for use in the disclosed system because of the necessity of rotating the dewar 10.

A series of flat cables 38 also terminate at the outer perimeter of the feed-through substrate 70 and connect to terminals 71. This provides a convenient means of interconnecting the array of infrared detectors 11 with the electronic circuitry mounted on circuit boards 21.

Figure 5:
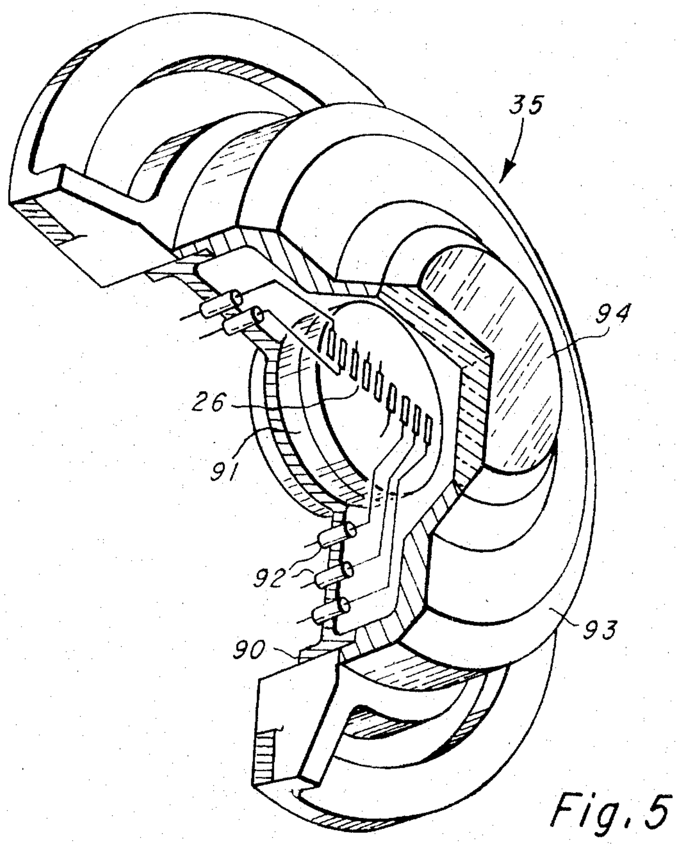
FIG. 5 is a pictorial drawing of the emitter head with portions whon in cross section.

Referring now to FIG. 5, there is shown the details of the emitter head assembly 35. The emitter head assembly 35 includes a mounting ring 90. Positioned on the mounting ring 90 is an insulating substrate 91. The array of light emitting diodes 26 is mounted on the substrate 91 and leads are bonded from each of the emitters to individual feed-throughs 92. Secured to the mounting ring 90 is a window holding ring 93. A window 94 is mounted in the window holding ring 93 to permit the array of emitters 26 to be viewed.

Figure 6:
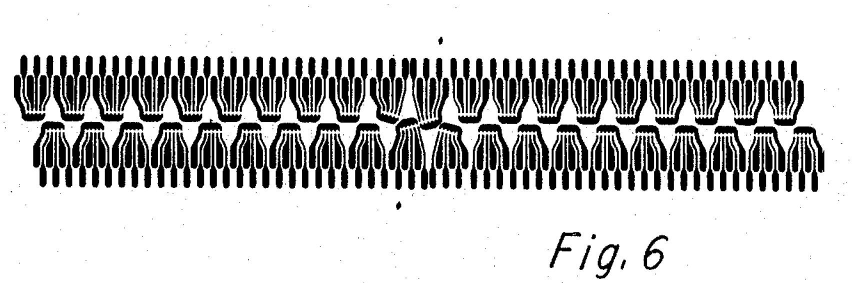
FIG. 6 is a top view of an array suitable for use as either the detector or the emitter array.

Referring now to FIG. 6, there is shown in plan view an array of diodes. This basic array configuration is suitable for use as either the detector array 11 or the emitter array 26, the basic difference between the emitters and the detectors being the semiconductor material and the dopants used in forming the diodes. In all cases, there should be a one-to-one correspondence between the number of diodes in the detector array 11 and the number of diodes in the emitter array 26. In the case of the detector array, the diodes can be made by difusing impurities into a mercury-cadmium-telluride semiconductor. In the case of the emitters, the diodes may be made by selectively doping gallium arsenide. In general, the emitter array will have larger diodes than the detector array. However, this is not a necessary feature of the system. It should be noted that the size of the diodes in the array of infrared detectors determines the resolution of the scanner system and influences the overall size of the system. Therefore, the array should contain as many elements as possible and each diode should be as small as practical considering the state of the art.

Figures 6A, 7:
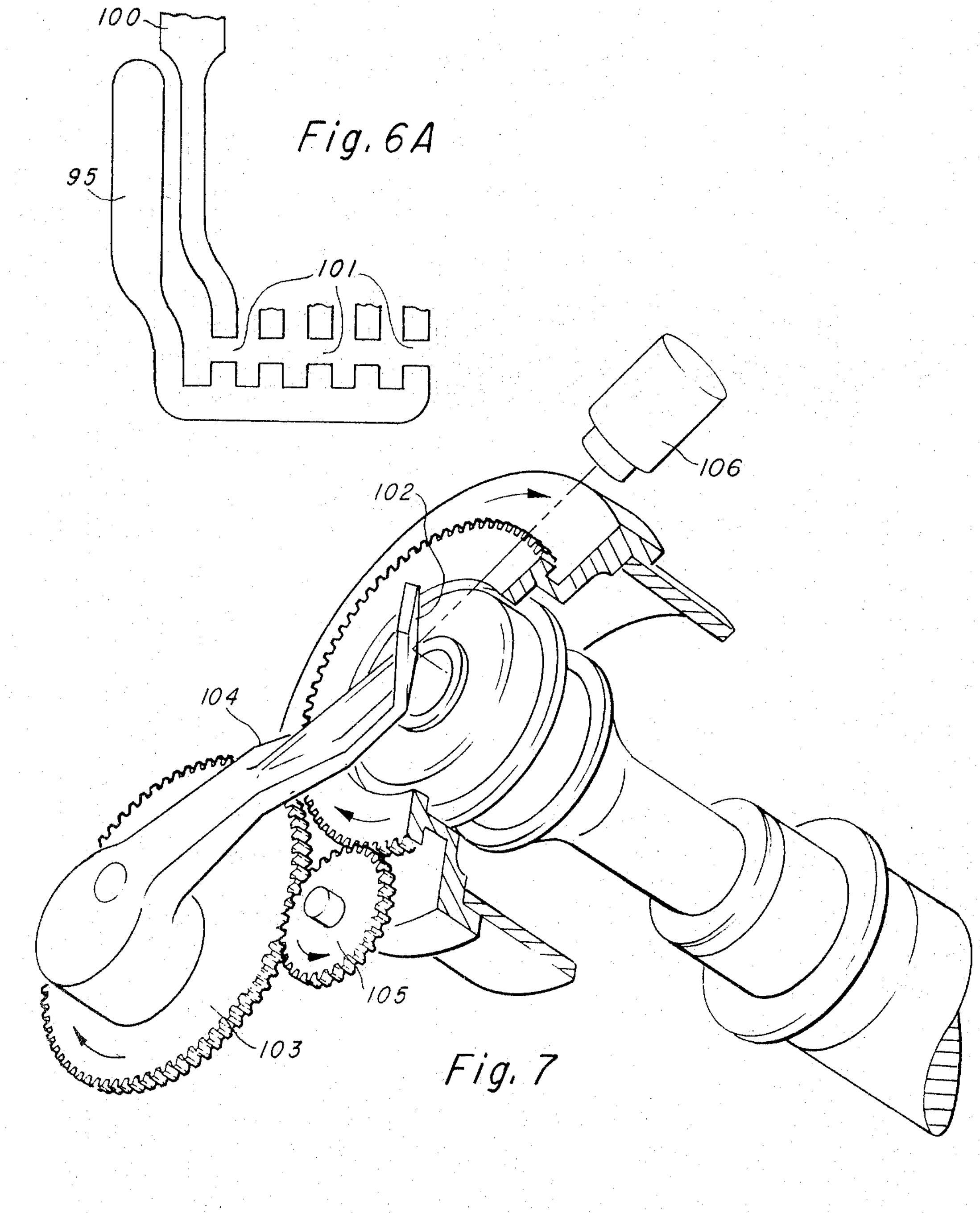
FIG. 6A is an enlarged view of one group of the diodes comprising either the detector or emitter arrays.
FIG. 7 is a pictorial view of the chopper mirror and the temperature reference source.

Referring now to FIG. 6A, there is shown in detail a larger view of one of the groups of the diodes comprising the array illustrated in FIG. 6. Each of these groups of diodes include one common anode connection 95 and a separate cathode connection 100 for each diode of the array. The area between the cathode connection 95 and the anode connection 100 indicated at reference numeral 101 forms the active regions of the diodes comprising the array.

As previously noted, the layout of the detector and emitter arrays may be identical. However, the semiconductor materials used to form the active regions will usually be different.

Referring now to FIG. 7, the functioning of the light chopper will be explained. The function of the light chopper is to periodically deflect the field of view of the array of infrared detectors 11 such that this array receives infrared radiation from a temperature reference source 106. The temperature reference source 106 is maintained at a temperature such that it emits infrared radiation equal to the infrared radiation received from the background of the scene as viewed by the array of infrared detectors 11.

The chopper includes a mirror 102 which is attached to a gear 103 by a shaft 104. An idler gear 105 couples the gear 103 to the rotating portion of the scanner. This causes the mirror 102 to be positioned for a very short period during each rotation cycle of the array of infrared detectors 11 such that the field of view of the array of infrared detectors 11 is deflected causing the array of infrared detectors 11 to receive radiation from the temperature reference source 106. This provides a reference signal to be used during the DC restore cycle. This will be explained in detail later.

An idler gear 105 is used to couple the gear 103 to the rotary portion of the viewer in order to assure that the mirror 104 rotates in the same direction as the array of infrared detectors 11. This causes less distortion of the final display than would occur should the mirror 102 and the array of infrared detectors rotate in opposite directions.

The temperature reference source 106 is typically a heat sink mounted on a thermoelectric cooler. The cooler, not shown in detail, is a thermoelectric cooler and cools the heat sink if the current is passed through the thermoselective cooler in one direction and heats the heat sink if the current is reversed. This permits the temperature reference 106 to be either cooled or heated to maintain the temperature reference 106 at a temperature corresponding to the average temperature of the scene viewed by the scanner system.

Figure 8A:
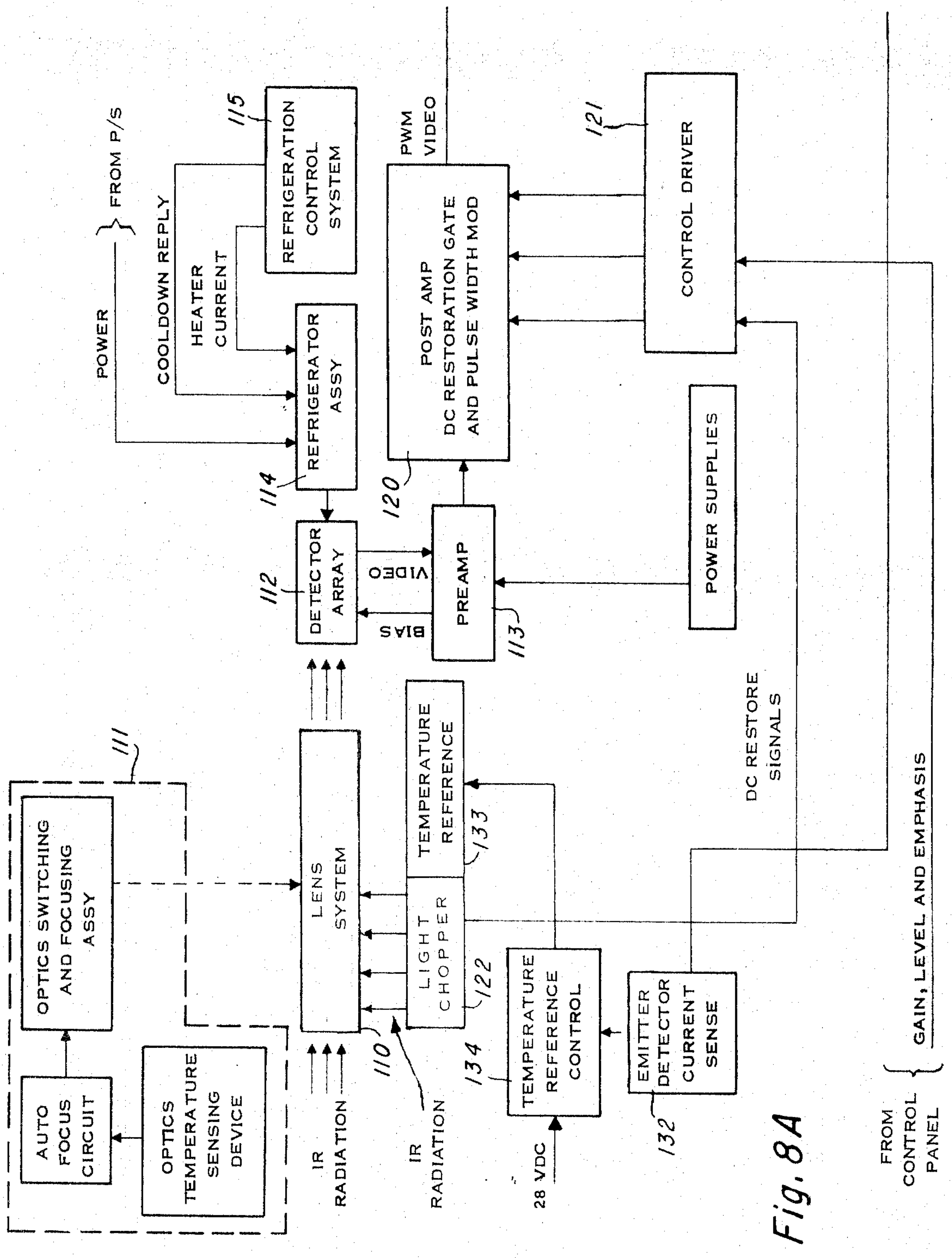
FIGS. 8A and 8B are functional block diagrams of the system.
Figure 8B:
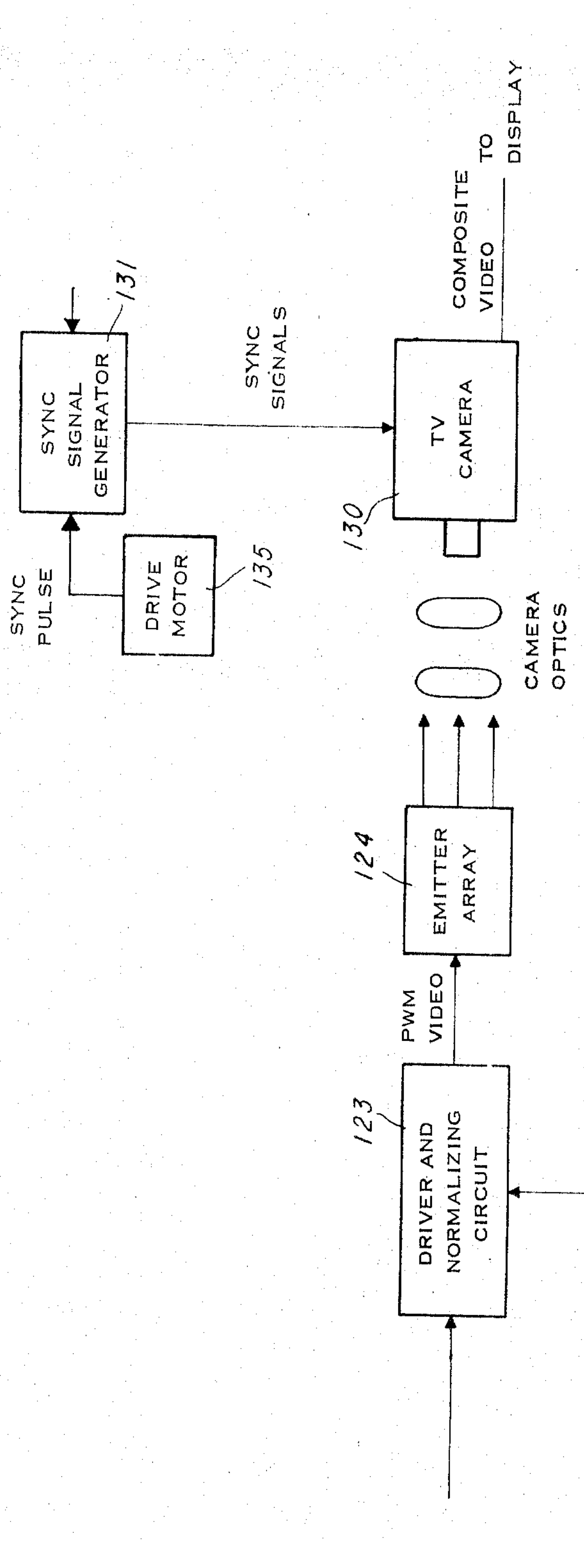

Referring now to FIGS. 8A and B, there is shown a functional block diagram of the entire scanner system. The infrared radiation from the scene being viewed enters the system through a lens system shown symbolically at reference numeral 110. The lens system 110 also includes an automatic focusing mechanism 111. This automatic focusing mechanism refocuses the lens system 110 to compensate it for changes in temperature. This feature substantially improves the performance of the scanner over the operating ambient temperature ranges. Using this technique, accurate focusing can be accomplished over a temperature range from 30° to 130°F.

The detector array is shown symbolically at reference numeral 112. In operation the detector array 112 receives bias signals for biasing each of the diodes comprising the detector array 112 from the preamp circuit 113 and produces a video signal in response to the infrared radiation impinging upon each of the individual diodes comprising the array. The signals are amplified by preamp circuit 113. The refrigerator assembly 114 is controlled by a refrigerator control system 115. The refrigerator assembly 114 includes both a cooling and a heating cycle permitting the temperature of the array of infrared detectors 11 to either be increased or decreased to maintain the temperature relatively constant. The coldfinger and the array of infrared detectors 112 are mounted in a vacuum as previously discussed to provide an assembly in which the thermal resistance between these elements and the surrounding environment is very high. This permits the array of infrared detectors 112 to be efficiently cooled but presents a control problem because of the time required for the temperature to increase, if the temperature should be reduced too much by the refrigerator assembly 114. The refrigerator assembly 114 is provided with a heater to overcome this difficulty. The refrigerator control 115 selects the cooling or the heating cycle, as required, to maintain the temperature of the detector array 112 relatively constant and at a preselected valve.

The video output signal of the preamplifier 113 is coupled to a post amplifier 120. The post amplifier 120 includes all the circuitry necessary for D.C. restoration of the video signal and a pulse width modulator to produce apulse width modulated video signal at the output of this amplifier. The post amplifier 120 is controlled by a control driver circuit 121. The control driver circuit 121 receives gain, level and emphasis signals from the control panel of the system and D.C. restore signals from the light chopper 122.

The output signals of the diodes comprising the infrared detector array 112 are varying DC voltages. The average DC components of these signals are determined by the infrared radiation from the background of the scene being scanned. The varying (AC) components are due to targets emitting infrared radiation in excess of or less than the average radiation emitted by the background. The AC components of these signals are relatively low in amplitude making it impractical to amplify them using direct coupled amplifiers. This problem is solved by amplifying each of these signals in an AC coupled preamplifier 113 and restoring the DC component of the amplified signal to assure that it has the proper average DC valve.

DC restoration is accomplished by periodically deflecting the field of view of the scanner so that the detector array 112 receives radiation from a temperature reference 133. During this period the output of the AC amplifier is clamped to a reference voltage (ground being a convenient reference). This established the average DC level of the output of each of the AC amplifiers as zero.

The output signals of all the diodes comprising the detector array 112 are averaged during the time when the scene is being scanned and during the time when the temperature reference source is being viewed. These two measurements are compared and the temperature of the temperature reference source 133 is adjusted until these two measurements are equal. This prohibits saturation of the AC amplifiers due to differential signals which would be produced by the light chopper 122 as the field of view is switched from the scene being scanned to the temperature reference 133 and vice versa if there was a large temperature differential between the background of the scene and the temperature reference 133.

The pulse width modulated video signal from the post amplifier 120 is fed into a driver and normalizing circuit 123. This circuit generates the drive current signals for the emitter array 124. The driver and normalizing circuit 123 includes a D.C. level control for each element of the emitter array 124 to permit the signal to each element of the emitter array 124 to be adjusted to produce a uniform background. The preamplifier circuit 113 also includes a gain control for each element of the detector array 112 permitting the amplitude of these signals to be adjusted to generate a display in which the output of each element of the emitter array 124 is proportional to the intensity of the infrared radiation impinging upon the corresponding element of the detector array 112. The driver control circuit 121 receives gain, level and emphasis signals from the system's control panel as previously discussed. The gain and level controls permit the system's operator to adjust the background level and the contrast of the display and the emphasis control permits the operator to adjust the display level for low level targets with respect to high level targets so that either high level or low level targets may be emphasized with respect to the other, as desired.

A TV camera 130 is focused on the emitter array 124 and produces a composite video signal. A sync signal generator 131 receives sync pulses from the drive motor and generates a sync signal for the TV camera 130. The sync signal generator 131 receives speed limit signals from the drive motor drive circuits (not shown) to override the scan motor sync pulses when these signals deviate from normal by an amount such that the TV camera 130 can no longer be properly synchronized.

Although the invention has been described and defined with respect to specific embodiments, it will be recognized by those skilled in the art that many modifications and changes may be made, all of which will be within the scope of the invention as described and claimed.

What is claimed is:

1. A scanner system for scanning a scene of interest comprising:

a. a rotating member, b. an array of electromagnetic radiation detectors attached to said rotating member for rotating therewith to scan said scene and producing electrical signals responsive to the electromagnetic radiation from said scene, and c. an array of emitters attached to said rotating member for rotation therewith, said array of emitters responsive to said electrical signals for producing output signals indicative of an image of said scene.

2. A scanner according to claim 1 further including electronic means attached to said rotating member for rotating therewith and interconnecting said detectors to said emitters for coupling the electrical signals of the detectors to the emitters.

3. A scanner according to claim 2 further including an optical system interposed between said scene and said detectors for focusing radiation from the scene on said detectors.

4. A scanner system according to claim 2 wherein the number of emitters equals the number of detectors and the electronic means includes one channel for each emitter-detector pair.

5. A scanner system according to claim 3 wherein said optical system is a lens.

6. A scanner system according to claim 4 wherein said emitters and detectors each comprise a plurality of semiconductor diodes arranged in a predetermined pattern.

7. A scanner system according to claim 1 wherein said detectors detect radiation in the infrared region of the electromagnetic spectrum.

8. A scanner system according to claim 1 wherein said emitters are light emitters operating in the visible region of the electromagnetic spectrum.

9. A scanner system according to claim 1 further including a television camera focused on said array of emitters to produce a video signal in response to said output signals.

10. A method for scanning a predetermined area of interest comprising the steps of:

a. rotating an array of detectors to scan an area of interest for producing electrical signals responsive to the radiation from said area, and b. rotating an array of emitters synchronously with the array of detectors the array of emitters having said electrical signals coupled thereto for producing output signals related to said area of interest.

11. The method of claim 10 further including the step of focusing the radiant energy from said area of interest onto said rotating array of detectors.

12. The method for scanning according to claim 10 further comprising the step of producing a visual image of said area of interest in response to said output signals.

* * * * *